United States Patent

[11] 3,591,133

[72] Inventors Michael E. Miles
   Northborough;
   James F. Donnelly, Worcester, both of, Mass.
[21] Appl. No. 754,925
[22] Filed Aug. 23, 1968
[45] Patented July 6, 1971
[73] Assignee Jamesbury Corporation
   Worcester, Mass.

[54] BUTTERFLY VALVE
   2 Claims, 4 Drawing Figs.
[52] U.S. Cl. .................................................. 251/173,
   251/210, 251/306, 251/308
[51] Int. Cl. ...................................................... F16k 13/02
[50] Field of Search .......................................... 251/306,
   286, 173, 306, 308; 137/242; 187/52.08

[56] References Cited
UNITED STATES PATENTS

| | | | |
|---|---|---|---|
| 688,860 | 12/1901 | Kay et al. | 207/52.08 X |
| 1,905,684 | 4/1933 | Coffman | 251/286 X |
| 2,586,927 | 2/1952 | Fantz | 251/306 |
| 2,893,682 | 7/1959 | Hintzman | 251/173 |
| 2,980,388 | 4/1961 | White | 251/306 UX |
| 3,288,163 | 11/1966 | Craven | 137/242 |
| 3,304,050 | 2/1967 | Fawkes | 251/173 X |

Primary Examiner—Harold W Weakley
Attorneys—Robert F Conrad and Kurt Shaffert

ABSTRACT: An improved butterfly valve of the type wherein a disc mounted for rotation about a nondiametric axis and having a continuously convergent circumferential sealing surface which cooperates with a wall-mounted annular flexible seat is disclosed. The inwardly projecting nature of the flexible seat subjects it to highly erosive forces when fluid is throttled between it and the disc when the disc is opened to a throttling position, i.e. approximately 15° from the closed position or greater. To protect the seat from such erosive forces, the rigid wall of the fluid flow channel is projected inwardly on both sides of the seat to provide a far more erosion-resistant surface for throttling operation. These same inward projections can also be employed to provide a scraping lip which will remove solids buildup from the sealing surface of the disc as it is rotated toward the seat. A manner of affixing the disc to the shaft without providing a leak path across the disc and whereby the forces imposed by fluid pressure upon the disc are transmitted directly to the shaft is also disclosed. This entails passing the shaft through a shaft bore in an integrally formed gudgeon in said disc and passing tapered pins parallel to the surfaces of the disc through the gudgeon and shaft in such a manner that a majority of, but not the entire circumference of, the tapered pin lies within the circumference of the shaft. Rotation of the disc beyond the desired one-quarter turn from the fully closed to the fully open position and displacement of the disc along the direction of the axis of the shaft are prevented by lugs extending into the fluid flow channel from the valve body.

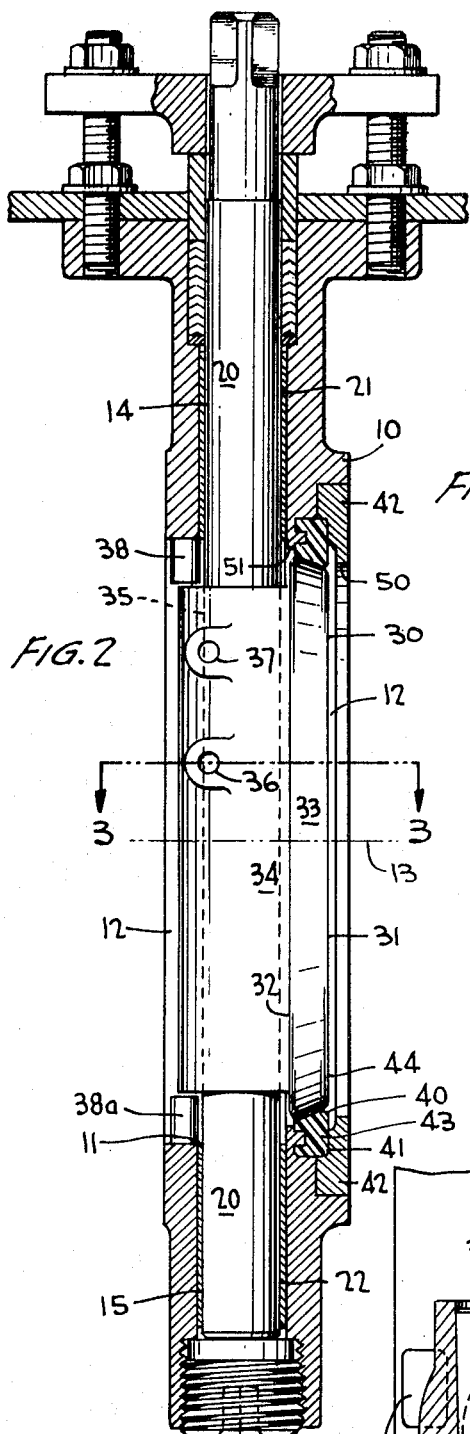
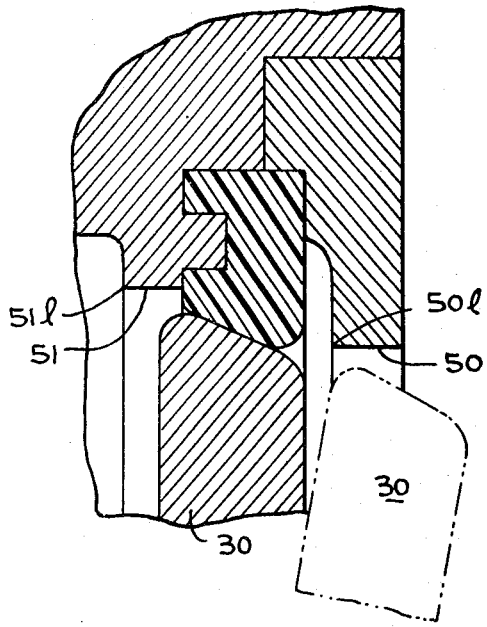
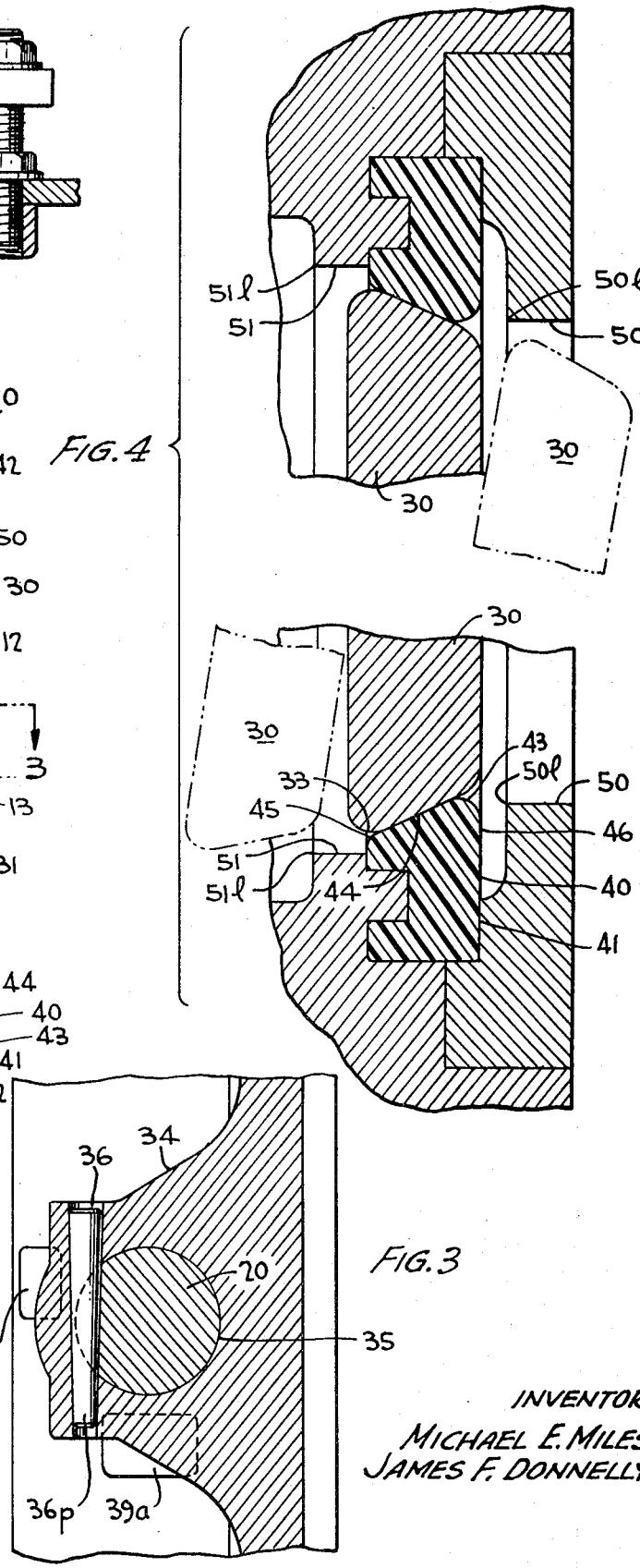
FIG. 2
FIG. 3
FIG. 4
INVENTORS,
MICHAEL E. MILES
JAMES F. DONNELLY

BUTTERFLY VALVE

BACKGROUND OF THE INVENTION

This invention relates to improved rotary valves for the control of fluid flow and more specifically to butterfly valves. In this type of valve a valve disc or butterfly is mounted in the valve body to rotate about an axis from an open position in which the disc lies parallel to the flow axis to a closed position in which it lies perpendicularly to the flow axis. More particularly, the invention relates to the type of butterfly valve in which a flexible seat is disposed around the periphery of the flow channel for coaction with a sealing surface on the circumference of the butterfly disc when the latter is rotated into the closed position.

The invention is particularly applicable to valves of this type in which internal fluid pressure serves to improve the coaction of the seat with the sealing surface on the butterfly.

Butterfly valves of the type in which a flexible seat projects into the fluid flow channel from the periphery thereof are disclosed in the Hintzman et al. U.S. Pat. No. 2,893,682 and the White U.S. Pat. No. 2,980,388. Although valves such as this and others known to the prior art are useful in certain types of service, problems of seat life arise in strenuous service from the fact that the flexible seat is exposed to the high-pressures and rapid flow rates that prevail in the fluid stream. During the act of closing the valve, as the butterfly approaches the seat, the erosive effect of fluid rushing with ever-increasing velocity past the flexible seat as the flow area is throttled down accentuates these harmful effects. Also, where the nature of the fluid passing through the valve is such that solid particles may collect on the sealing surface of the butterfly disc, these particles will tend to damage the flexible seat when the valve is closed.

Butterfly valves are also employed for throttling service, i.e. service wherein the valve is used to reduce the fluid pressure to some predetermined fraction (not greater than 1, obviously) of that prevailing upstream. It has been found that butterfly valves are reliable for throttling service at openings such as are provided by rotation of the disc of at least approximately 15° from the closed position. At disc positions opened to a substantially lesser extent the valve tends to be unstable due to fluid vortexing. At disc openings substantially greater than 70° degrees from the closed position, virtually full flow is attained. Thus the effective range for throttling is disc rotations on the order of 15° to 70° from the closed position, plus or minus about 5°. Thus it is particularly desirable to protect the seat from the erosive forces produced by fluid throttling in this range of disc openings.

Another problem frequently encountered with butterfly valves of the type described known to the prior art stems from the fact that fluid pressure acting on the bottom of the shaft is essentially unopposed by fluid pressure acting upon any other surface in the opposite direction and thus creates a resultant upward force upon the shaft. With the butterfly rigidly attached to such shaft any upward movement of the shaft created by such unbalanced force results in the removal of the butterfly from its position of optimum cooperation with the flexible seat.

It is an object of this invention to provide a butterfly valve of the type described wherein no displacement of the butterfly from its position of optimum cooperation with the flexible seal means occurs due to the action of the said resultant upward force upon the shaft.

Where a valve is employed to control the flow of flammable fluids it is highly desirable that its structure permits it to provide at least a relatively effective seal even if the valve has been exposed to quite high temperatures, such as would prevail during a fire. Otherwise the fire, which tends to char and destroy the flexible seat and other organic elements of a valve, may release the flow of the flammable fluid and thereby increase the ferocity of the fire.

It is still another object of this invention to provide a butterfly valve of the type described wherein a relatively effective seal can be maintained despite heat damage to the seat and other organic elements thereof.

Other advantages and objectives of this invention and the manner of their attainment will be apparent to those skilled in this art from a consideration of this specification when taken in conjunction with the accompanying drawing.

SUMMARY

In butterfly valves of the type described, the necessity for projecting the radially inwardly portion of the annular seat into the flow channel creates a situation where the seat is readily subjected to excessive wear conditions. Inasmuch as it is required, in valves of this type, that surfaces of the seat which are noncolinear with the sealing surface thereof be exposed to the fluid stream so that the fluid pressure may enhance the sealing effectiveness of the seat, it is not possible to protect the seat by disposing all but the sealing surface thereof within the valve body and out of the flow channel as is done for instance in the valve disclosed by Bryant in U.S. Pat. No. 3,000,609.

According to the instant invention, an annular rigid-surfaced ring element may be disposed upstream of the seat. It is desirable that this element extend radially inward as far, or at least nearly as far, into the fluid stream as the radially inwardmost segment of the seat itself. Thus, the annulus of the said ring element should not be substantially larger than that of the seat. The thus placed ring element will materially reduce the deleterious effect of direct impingement by the rapidly flowing fluid upon the portion of the seat projecting into the flow channel. The ring element may also serve to protect the seat from direct high-velocity impingement by particles which may be entrained in the fluid stream. Where a butterfly valve is to be used in service in which fluid flow may alternatively occur in either direction, a ring element of the type described is employed on either side of the seat. This provides dual advantages. Firstly, the seat is provided with the type of protection described above from whichever ring element happens to be in the upstream location. Secondly, the instant invention may be used to optimum advantage in protecting the seat during throttling of the fluid stream where ring elements upstream and downstream of the seat are employed. When the valve is employed to throttle the fluid stream, fluid passes through a flow channel of considerably smaller cross-sectional area than when the valve is set for full flow. The attendant increased linear fluid velocities impose highly erosive forces upon the surfaces which bound this reduced cross-sectional area. Thus, where throttling occurs between the sealing surface of the disc on the one hand and the seat on the other hand, these erosive forces act upon the flexible seat. Where rigid surfaces are projected into the fluid flow channel on either side of the seat so that these rigid surfaces are closer to the sealing surface of the disc when the valve is in a throttling position (i.e. approximately 15° or greater from the closed position) these surfaces will form the boundary of the reduced cross-sectional area flow channel, thereby diverting the erosive throttling forces from acting upon the seat. It will be seen from a consideration of the geometry of these valves that at any throttling position of the disc two points on the circumference of the seat must necessarily be closer to the sealing surface of the disc than any point on the respective ring elements, so that this beneficial effect of the instant invention can not be made to apply to all portions of the circumference of the seat simultaneously. However, the two thus unprotected points on the circumference of the seat will be in a different location on the seat for every different throttling setting of the disc, so that even this deleterious effect is ameliorated by distribution about the circumference of the seat during typical use of a valve. It is of course necessary that the ring elements do not project into the flow channel so far as to intersect the locus of rotation of the disc. However, it is desirable that the annulus of the ring elements come as close as possible to this locus. If the diameter of the annulus of the ring element is sufficiently small to assure that every point on that portion of the circumferential sealing surface of the disc which is rotated toward that particular ring element (as opposed to that portion of the circumferential sealing surface which is rotated toward the other ring element) in opening the valve is closer to that ring element than to any portion of the flexible seat, the advantages of the invention in protecting the seat during fluid throttling will be attained. It will also be apparent to one skilled in this art from a consideration of this specification and drawing that these advantages can also be realized without providing fully circumferential annular ring elements, but by employing suitable disposed rigid-walled projections into the fluid channel.

Protection of the radially inwardly projecting flexible seat required in valves of the instant type against other forms of damage are also provided by the instant invention. Thus, closing of the valve when the disc has been displaced in the direction along the axis of the shaft would tend seriously to mar or gall the seat. Likewise, rotating the disc fully about its axis of rotation can cause such harm. This latter danger exists especially in valves of this type wherein the disc is mounted for rotation about an axis other than a diameter of the disc. Such nondiametric mounting of the disc for rotation is especially desirable where the circumferential seating surface is a continuously converging surface. Conveniently, this surface may be a segment of a sphere having its center on the axis of the flow channel through the valve, or a frustum of a cone having its apex on the same axis. The advantage of mounting discs having such circumferential sealing surfaces nondiametrically is that when rotated, the circumferential sealing surface on such a disc moves away from the seat at all points along the circumference thereof, rather than scraping across the seat during each opening and closing.

It can readily be appreciated that the full rotation of such a nondiametrically mounted disc could seriously damage the seat. According to this invention, the valve body is provided with lugs projecting into the fluid flow channel which prevent the rotation of the disc through a substantially greater extent than the 90° rotation required to go from a fully closed to a fully open position.

These same lugs may be positioned in accordance with this invention to prevent the displacement of the disc in either direction along the axis of the shaft on which the disc is mounted.

Rigid attachment of the disc to the shaft for rotation therewith is also an important feature of a design whereby precise positioning of the disc with respect to the seat assures that the valve will not be subject to seat damage due to improper cooperation between the circumferential sealing surface of the disc and the seat.

According to the instant invention the disc has a shaft bore passing through an element, such as a gudgeon, formed integrally therewith. The shaft is secured within the shaft bore by means which require no opening (and thus provide no potential leak path) between one face of the disc and the other. Suitable fastening may be provided by at least one tapered pin passing through the gudgeon and shaft bore parallel to the face of the disc in such a manner that a majority of, but not all of, the circumference of the tapered pin passes through the shaft. In this manner, the pin compresses the shaft against the opposite side of the shaft bore rather than being placed in shear at both surfaces where it enters and leaves the shaft, as would be the case if the pin passed centrally through the shaft.

A special advantage of the instant invention is that it may be employed in the design of butterfly valves for so-called "fireproof" service. Ordinarily, butterfly valves fail when subjected to temperatures at which the organic components thereof, such as the seat and possibly portions of the bearings lose their structural properties. This temperature may be referred to as the heat destruction temperature. By mounting the shaft of a valve of the instant invention in bearings having a similar heat destruction temperature as that of the seat and having a thickness of the same order of magnitude as the clearance between the locus of rotation of the disc and the annulus of the ring element, substantially effective metal to metal sealing can be provided between the disc and the ring element in the event of the heat failure of the seat and the bearings, the upstream fluid pressure deflecting the disc and shaft downstream into this metal to metal seating position.

BRIEF DESCRIPTION OF THE DRAWING

FIG. 2 is a cross-sectional representation of the same embodiment of the invention as viewed along the plane indicated by line 2-2 in FIG. 1;

FIG. 3 is a cross-sectional representation, as viewed on the plane indicated by line 3-3 on FIG. 2, of several features of the same embodiment of the instant invention;

FIG. 4 is a somewhat schematic cross-sectional representation of the same embodiment of the instant invention illustrating the principle of its operation, the valve disc when being opened to a throttling position being shown by phantom lines.

DESCRIPTION OF A PREFERRED EMBODIMENT OF THE INSTANT INVENTION

Figure 1:
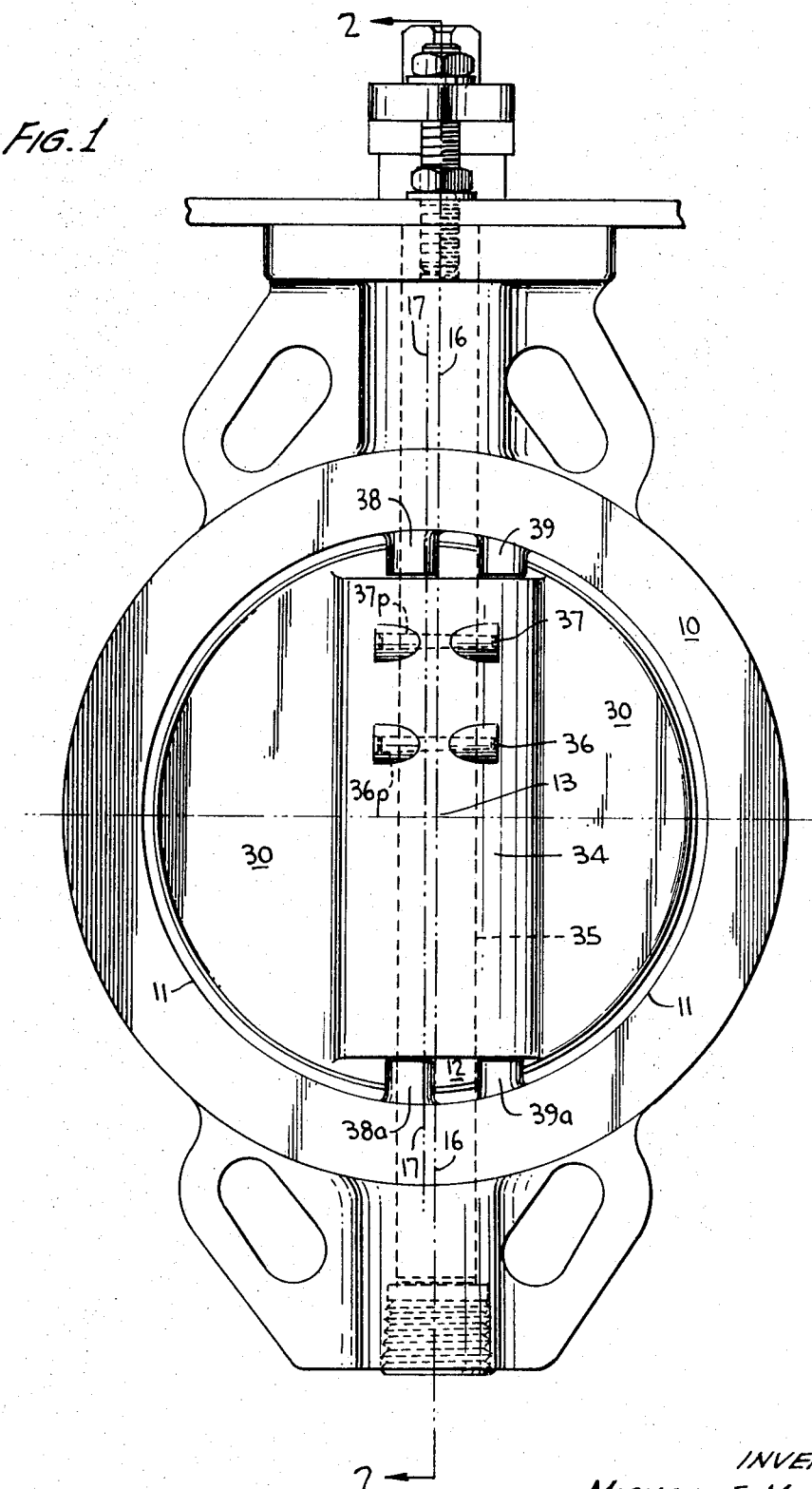
FIG. 1 is an elevation of a preferred embodiment of the invention.

As may best be seen in FIGS. 1 and 2, valve body 10 defines by its internal walls 11 a fluid flow channel 12 having an axis 13. The valve housing may be formed of any suitable material of construction, as for instance an appropriate metal such as stainless steel.

The valve body 10 also has cavities 14 and 15 disposed therein, colinearly aligned at opposite ends of flow channel 12. As may best be seen in FIG. 1, the axis 16 of these cavities is displaced slightly from the diameter 17 of the flow channel. Therefore this axis, and the axis of the shaft to be mounted in these cavities, extends in the manner of a secant other than a diameter, or nondiametrically, across the fluid flow channel.

Shaft 20 extends transversely across fluid flow channel 12, perpendicular to the axis 13 thereof. Upper and lower shaft bearings 21 and 22, respectively, are disposed in cavities 14 and 15, respectively. These bearings are sleeve bearings and may conveniently be made of self-lubricating plastic-metal laminates such as Teflon*

---

Registered Trademark, E. I. duPont de Nemours and Company for poly(tetrafluoroethylene). -impregnated perforated stainless steel. The thickness dimension of these bearings may be carefully controlled to provide the fireproof valve feature discussed elsewhere in this specification.

Disc 30 has parallel, circular faces 31 and 32 and is bounded by a continuously convergent circumferential sealing surface 33. In the embodiment shown, surface 33 is a frustum of a cone having its apex on axis 13 (extended), but other convergent surfaces, such as segments of spheres, may also be used. Formed integrally with disc 30 is gudgeon 34, having shaft bore 35 adapted to receive shaft 20 passing therethrough. Tapered pinholes 36 and 37 pass through said gudgeon parallel to faces 31 and 32 of said disc. As may best be seen in FIG. 3, said pinholes 36 and 37 pass through gudgeon 34 in such a fashion as to intersect nontangentially with shaft bore 35 so that when tapered pins 36p and 37p are placed therein a majority, but not all, of the circumference of said tapered pins will pass through shaft 20, assuring that shaft 20 will be compressed firmly against shaft bore 35. By this arrangement the resultant force of the fluid pressure acting on disc 30 is transmitted from the disc directly to shaft 20 (and thence to shaft bearings 14 and 15) without the buildup of stresses at the shear planes where the tapered pins enter and leave the shaft, as would be the case were the tapered pins to pass centrally through the shaft.

Lugs 38 and 38a projecting into flow channel 12 serve to prevent rotation of disc 30 beyond the fully open position. Lugs 39 and 39a serve to prevent rotation of disc 30 in the wrong direction from the fully closed position. Lugs 38 and 39 also serve to prevent the upward displacement of disc 30 along the direction of the axis of shaft 20 and lugs 38a and 39a similarly prevent the opposite displacement of disc 30.

Seat 40 is fashioned of stiffly flexible material such as Teflon or other polyfluorocarbon, nylon, polyethylene, rubber, rubber-resin blends or other suitable compositions. The radially outward portion 41 thereof is embedded in valve body 10. For ease of replacement, this embedding may be accomplished by the use of a removable retainer ring 42 which is conveniently made of the same metal as valve body 10.

The radially inward portion 43 of seat 40 has an annular sealing surface 44 as well as fluid contacting surfaces 45 and 46. As may better be seen in FIG. 4, these fluid contacting surfaces are noncolinear with sealing surface 44. Fluid pressure acting on these fluid-contacting surfaces may serve to deflect the radially inward portion 43 of seat 40 and thereby enhance the effectiveness of the sealing action between seat 40 and circumferential sealing surface 33 of disc 30.

Rigid-surfaced ring elements 50 and 51 are shown displaced in either direction along the axis of flow channel 12 from seat 40. As may best be seen in FIG. 4, these surfaces project radially inwardly close to the locus of rotation of disc 30 without intersecting it. Sharply angular lips 50(1) and 51(1) are formed at that circumferential element of each of these surfaces which is closest to that locus of rotation.

As may also be seen in FIG. 4, the rotation of disc 30 (as indicated by phantom lines) from the fully closed position toward throttling positions creates a condition where disc 30 is closer to surfaces 50 and 51 than to any point on seat 40, so that fluid throttling occurs between the rigid surfaces of disc 30 and rigid surfaces 50 and 51 rather than between disc 30 and flexible seat 40.

On the basis of this disclosure of the invention, that which we claim is:

1. A butterfly valve comprising a valve body of rigid material defining a circular cross-sectional fluid flow channel therethrough, an annular seat affixed by the radially outwardly portion thereof in said valve body to circumscribe said flow channel, said seat having a flexible radially inwardly portion protruding into said flow channel, a shaft aligned nondiametrically across said flow channel at a point axially displaced along said flow channel from said annular flexible seat, a valve disc mounted for rotation about the axis of said shaft, the circumferential surface of said disc constituting a segment of a continuous geometric surface converging at a point on the axis of said flow channel, said surface constituting a sealing surface adapted to cooperate with said annular seat, the radially inwardly portion of said annular flexible seat having an annular sealing surface adapted to cooperate with said circumferential sealing surface on said disc to block flow through said channel when said disc is rotated into the closed position perpendicular to the axis of said flow channel, another annular surface of said inwardly portion of said annular flexible seat, disposed noncolinearly to said annular sealing surface thereof, exposed to the fluid in said flow channel and adapted to augment the sealing effectiveness of said seat against said disc by the action of fluid pressure, said valve effectively controlling the flow of fluid therethrough at any desired proportion not greater than unity of the fluid pressure prevailing upstream thereof by rotation of said disc about the nondiametric axis to any flow-controlling position at least about 15° from said closed position, an annular rigid-surfaced ring element axially displaced along said flow channel from said shaft and from said annular seat, but proximate to the latter, the annular opening thereof projecting radially inward to an extent short of intersecting with the locus of rotation of said disc but sufficient to assure that, when said disc is in said flow-controlling position, every point on said circumferential sealing surface on that portion of the disc rotated in, the axial direction toward said ring element is closer to said ring element than to any portion of said flexible seat, and another said ring element being positioned on the opposite side of said seat from the first said ring element, the respective extremities of said shaft being mounted in narrow-walled sleeve bearings inserted into cavities in said valve body, the materials from which said sleeve bearings and said flexible portion of said annular seat are formed having a heat-destruction temperature considerably lower than that of said valve body and said disc, the wall thickness of said sleeve bearings being substantially the same as the clearance between the locus of rotation of said disc and said ring elements, whereby substantial sealing effectiveness is retained by said valve despite heat damage thereto.

2. A butterfly valve comprising a valve body of rigid material defining a circular cross-sectional fluid flow channel therethrough, an annular seat affixed by the radially outwardly portion thereof in said valve body to circumscribe said flow channel, said seat having a flexible radially inwardly portion protruding into said flow channel, a shaft aligned nondiametrically across said flow channel at a point axially displaced along said flow channel from said annular flexible seat, a valve disc mounted for rotation about the axis of said shaft, the circumferential surface of said disc constituting a segment of a continuous geometric surface converging at a point on the axis of said flow channel, said surface constituting a sealing surface adapted to cooperate with said annular seat, the radially inwardly portion of said annular flexible seat having an annular sealing surface adapted to cooperate with said circumferential sealing surface on said disc to block flow through said channel when said disc is rotated into the closed position perpendicular to the axis of said flow channel, another annular surface of said inwardly portion of said annular flexible seat, disposed noncolinearly to said annular sealing surface thereof, exposed to the fluid in said flow channel and adapted to augment the sealing effectiveness of said seat against said disc by the action of fluid pressure, said valve effectively controlling the flow of fluid therethrough at any desired proportion not greater than unity of the fluid pressure prevailing upstream thereof by rotation of said disc about the nondiametric axis to any flow-controlling position at least about 15° from said closed position, an annular rigid-surfaced ring element axially displaced along said flow channel from said shaft and from said annular seat, but proximate to the latter, the annular opening thereof projecting radially inward to an extent short of intersecting with the locus of rotation of said disc but sufficient to assure that, when said disc is in said flow-controlling position, every point on said circumferential sealing surface on that portion of the disc rotated in the axial direction toward said ring element is closer to said ring element than to any portion of said flexible seat, a plurality of lugs, projecting into said fluid channel from said valve body, to prevent the rotation of said disc substantially beyond a quarter-turn rotation from the fully closed position to the fully open position, whereby avoidance of damage to the flexible annular seat caused by rotation of the nondiametrically mounted disc in the wrong direction is assured, said lugs being positioned to interfere with the displacement of said disc along the direction of the axis of said shaft, thereby assuring avoidance of damage to the annular flex-ible seat caused by seating of the disc when improperly positioned along the said direction